350-96.1 SR
XR 3,534,158

Oct. 13, 1 3,534,158

SINGLE PICKUP TUBE COLOR TELEVISION CAMERA SYSTEM

Filed Sept. 30, 1968

INVENTOR
R. L. EILENBERGER
BY John K. Mullarney
ATTORNEY

3534158
OR IN 358/49

United States Patent Office 3,534,158
Patented Oct. 13, 1970

3,534,158

SINGLE PICKUP TUBE COLOR TELEVISION CAMERA SYSTEM

Robert L. Ellenberger, Colts Neck Township, Monmouth County, N.J., assignor to Bell Telephone Laboratories, Incorporated, Murray Hill, N.J., a corporation of New York Filed Sept. 30, 1968, Ser. No. 763,839
Int. Cl. H04n 9/06
U.S. Cl. 178—5.4 7 Claims

ABSTRACT OF THE DISCLOSURE

A color separating prism assembly uses a right angle prism with dichroic layers on the diagonal surfaces thereof to color separate incident radiant energy. Additional prisms with selected dichroic surfaces are bonded thereto to form three separate, closely spaced, color-distinct, parallel light paths, with two of the paths equal in length. The prism assembly is cemented to a composite faceplate of a video camera tube. The faceplate is composed of two sections of fiber optic material separated by an intermediate section of prism-type material.

BACKGROUND OF THE INVENTION

This invention relates to color television camera systems and more particularly to a multiple image/single pickup tube color television camera system.

In deriving the several signals necessary for color television transmission, the typical practice has been to extract from the light coming through the camera lenses the primary light colors (e.g., red, blue and green) of the scene to be televised. Separate primary color images are then formed at individual color camera pickup tubes. In addition to the known technical difficulties of systems of this nature, the cost alone is formidable—particularly so if the three color cameras are image-orthicon tubes.

Accordingly, it is a primary object of the present invention to provide a single pickup tube color television camera system.

A related object is to provide a color television camera assembly which is simple in construction, of relatively low cost, yet highly efficient in operation.

Single pickup tube color television camera arrangements have been proposed heretofore (see, for example, the patent to J. M. Sherman et al., No. 2,658,103, issued Nov. 3, 1953). The known prior art arrangements, however, appear to suffer in one or more respects. Typically, they use color filters which pass the desired color components and adsorb the others. Color separation is thus achieved, but unfortunately this approach is quite inefficient, i.e., there is an appreciable loss of light. Other proposed arrangements, by their nature, incorporate multiple air/glass boundaries and hence these also are rather inefficient and reduce contrast.

The use of dichroic interference layers for color separation purposes has been proposed heretofore (see patent to L. T. Sachtleben et al., 2,672,072, issued Mar. 16, 1954), Such systems, using dichroic materials deposited upon substrates typically composed of plane parallel glass plates which are inclined at some preferred angle to the principal axis, are generally more efficient than those using color filters for color separation purposes. Here again, however, the proposed systems suffer in one or more of the above respects, and the problems of astigmatism, coma, "ghost" images, et cetera are bothersome, unless additional corrective optical elements are incorporated into the system. The inclusion of such corrective elements, however, makes the system excessively large and introduces additional glass-air boundaries.

It is accordingly a specific object of the present invention to provide a color separating optical assembly for a single pickup tube color television camera system utilizing dichroic interference layers with closely spaced parallel exit paths which result in geometrically identical, distinct, distortionless, images in line, each of small dimension, all in focus in the same plane, with plane parallel entrance and exit faces normal to the several optical paths, and with a minimum of air/glass boundaries.

SUMMARY OF THE INVENTION

These and other objects are attained in accordance with the present invention wherein a right angle prism is disposed in the path of incident light rays with the diagonal surfaces thereof positioned to deflect selected portions of the incident light at right angles to the path of travel. To this end, the diagonal surfaces are respectively coated with blue-reflective and red-reflective dichroic materials. Complementary blue-reflective and red-reflective dichroic surfaces are respectively disposed, in the blue and red reflected light paths, in parallel with the aforementioned blue- and red-reflective dichroic surfaces so as to form three separate, color-distinct, parallel light paths. The blue and the red complemental dichroic surfaces are separated by polygonal prisms which are bonded to the right angle prism with additional prisms bonded thereto to form an integral prism assembly having plane parallel entrance and exit faces normal to the several optical paths and no intervening air spaces, the blue and red light paths in said assembly being equal. The planar exit face of the prism assembly is secured to a composite faceplate of a video camera tube. The faceplate is composed of two sections of fiber optic material separated by an intermediate section of material similar to that of the prisms. The fiber optic sections serve to transfer the blue and red images to the rear of the faceplate, while the intermediate section lengthens the path of the unreflected light so as to achieve path equalization of all three paths.

DETAILED DESCRIPTION

Figure 1:
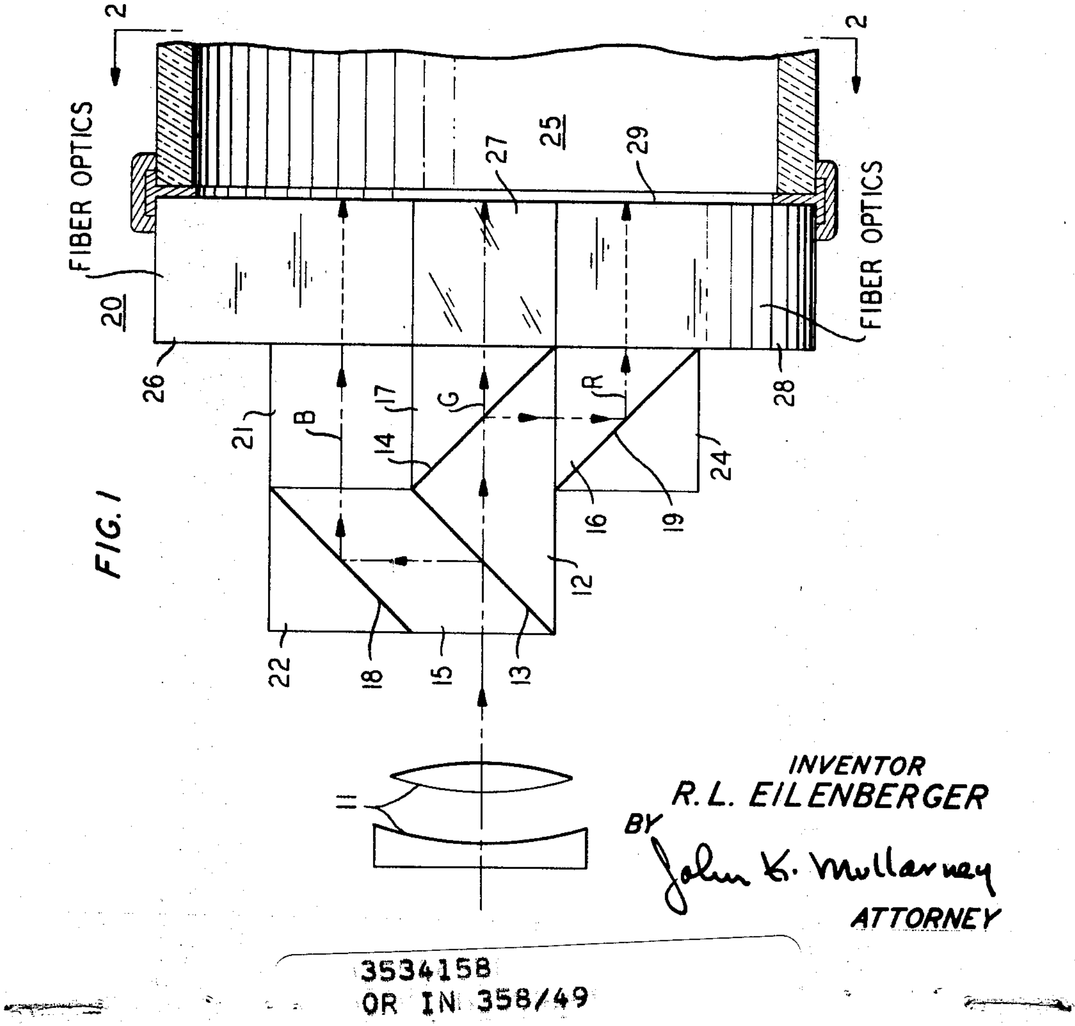
FIG. 1 is a diagrammatic representation of a color separating optical assembly for a single pickup tube color television camera system in accordance with the present invention.

Referring now to FIG. 1 of the drawings, the light from an object scene passes through an object lens system 11 to the optical prism assembly constructed in accordance with the principles of the present invention. The lens system, symbolically illustrated by lenses 11, preferably comprises a retrofocus telephoto lens, such as that made by Angénieux and others. The present invention, however, is in no way limited to such a lens system and other lenses may be advantageously utilized in conjunction with the present invention. Another lens approach, for example, is to use a normal objective to form an image in the plane of a format shaping aperture, with image transfer then carried out by means of a relay lens.

The right angle prism 12 is positioned in the path of the incident radiant energy with the diagonal surfaces 13 and 14 disposed to deflect selected portions of the incident energy at right angles to the path of travel, as depicted in FIG. 1. To this end, the diagonal surfaces 13 and 14 are respectively coated with blue-reflective and with red-reflective dichroic materials. A dichroic reflector in an optical system can be defined as one which will reflect light of a certain selected frequency or band of frequencies while transmitting light of other frequencies. The detailed theory and operation of dichroic reflectors is shown and described in a paper by G. L. Dimmick entitled "A New Dichroic Reflector and Its Application to Photo Cell Monitoring Systems," appearing in the Journal of the Society of Motion Picture Engineers, vol. 38, January 1942, beginning on page 36.

A red, blue and green primary color system is the one most often encountered in this art. However, other color systems have been proposed heretofore—such as cyan, yellow and magenta. Accordingly, while the description of the invention will proceed on the basis of a red, blue and green color separating optical assembly, the principles of the present invention are in no way limited thereto. All that is necessary to adapt the invention to a three color system other than red, blue and green is that the dichroic reflective materials be changed accordingly.

For purposes of light efficiency, the incident light rays first encounter the blue-reflective dichroic layer of surface 13, and thus the blue light in the spectrum of the incident energy is deflected, at right angles, in the upward direction, as shown in FIG. 1, through the rhomboid prism 15. The remaining light travels through the dichroic surface 13 and through prism 12 to the red-reflective dichroic surface 14. The red light in the spectrum is thence deflected, at right angles, in the downward direction, as shown in FIG. 1, into the prism 16. The light remaining, which is essentially green, passes through the dichroic surface 14 and then through prism 17.

The prisms 15, 16, and 17 are cemented to the prism 12, as shown in the drawing, and intervening air spaces are thus eliminated. The surface 18 of prism 15 is parallel to the surface 13 of the right angle prism. Likewise, the surface 19 of prism 16 is parallel to the surface 14. The surfaces 18 and 19 are respectively coated with blue-reflective and with red-reflective dichroic materials. Thus, the blue light rays reflected from surface 13 are once again reflected, at right angles, at surface 18, as illustrated in FIG. 1. Similarly, the red light rays reflected from surface 14 are reflected, at right angles, at surface 19. In this fashion, three separate, color-distinct, closely spaced, parallel light paths are formed.

The blue-reflectivity of the dichroic layer of surface 18 is complementary to that of blue-reflective surface 13, and the red-reflective surface 19 is likewise complementary to the red-reflective surface 14. That is, the cascaded dichroics are of selectively different spectral characteristics so as to complement each other and provide the desired overall spectral bandpass characteristic. For example, the complementary blue channel dichroic reflector 18 takes care of the fact that the primary blue-reflector characteristic which shapes the transmission of the short wavelength side of the green typically leaves much too wide a spectral transmission for the blue channel. The complementary blue channel reflector is, therefore, designed to shape the long wavelength side of the blue channel to the desired characteristics. Similarly, for the red channel.

The prisms 22 and 24 are cemented to the prisms 15 and 16, as shown in FIG. 1, to eliminate the air/glass boundaries at surfaces 18 and 19. This permits unwanted light (i.e., other than the desired reflected blue and red) to more readily escape. The prism block 21 is added to the blue channel, as shown, to achieve glass path equalization with the red channel. The prism 17 is bonded to the right angle prism 12 to provide required additional glass path length and a planar exit face normal to the light path. The provision of plane parallel entrance and exit faces normal to the several light paths, as evidenced in FIG. 1, serves to eliminate image distortion due to astigmatism and the like.

The prisms are preferably all made of the same type optical glass, or the equivalent, and thus all have the same index of refraction; the same is true of the intermediate section of the camera tube faceplate to be described hereinafter. The prisms 22 and 24 do not lie in the optical paths and hence need not be of a precision nature. For ease in explanation, the dichroic layers have been described as being coated in the diagonal surfaces 13 and 14 of prism 12, as well as on the surfaces 18 and

19. But all that is really necessary, of course, is that the dichroic layers be contiguous to and coextensive with said surfaces. For example, the dichroic layer described as being coated on surface 13 may in fact be coated on the undersurface of prism 15 which is bonded to surface 13, as shown in FIG. 1. The same will, correspondingly, be true of the other dichroics.

The integral prism assembly is placed in abutment against the outer surface of the faceplate 20 of the camera tube 25, as illustrated in FIG. 1. The prism assembly can be cemented to the faceplate or, alternatively, it may be fixedly secured thereto by any suitable clamping arrangement. The faceplate is composed of two similar sections 26 and 28 of fiber optic material separated by an intermediate section 27 of material (i.e., optical glass) similar to that of the prisms.

As is known to those in the art, a block of fiber optic material comprises a multitude of tightly packed, aligned, slender fibers, of glass or the equivalent, held together in a preferably dark cladding; such material is made by the Corning Glass Works, and others. In a preferred embodiment, the individual fibers were of substantially square cross-section to provide a higher packing fraction, approximately six microns on a side and of glass with preferably the same index of refraction as the prism glass. The fibers function as individual "light pipes" and serve to transfer the light incident at one end thereof to the remote end. This transfer of light images from one plane to a remote one is a known and widely used function of fiber optic blocks. The image transfer is essentially free of distortion and, as should be noted, contributes no path lengthening effect such as is inherent with homogeneous glass blocks as a result of the refraction of incident light. It is this latter feature which is advantageously utilized herein. Thus, the blue and red images focussed on the outer surface of the faceplate 20 are transferred by the fiber optic sections 26 and 28 to the inner photoconductive surface 29 of the camera tube 25, with no change in image size and with no defocussing.

Figure 2:
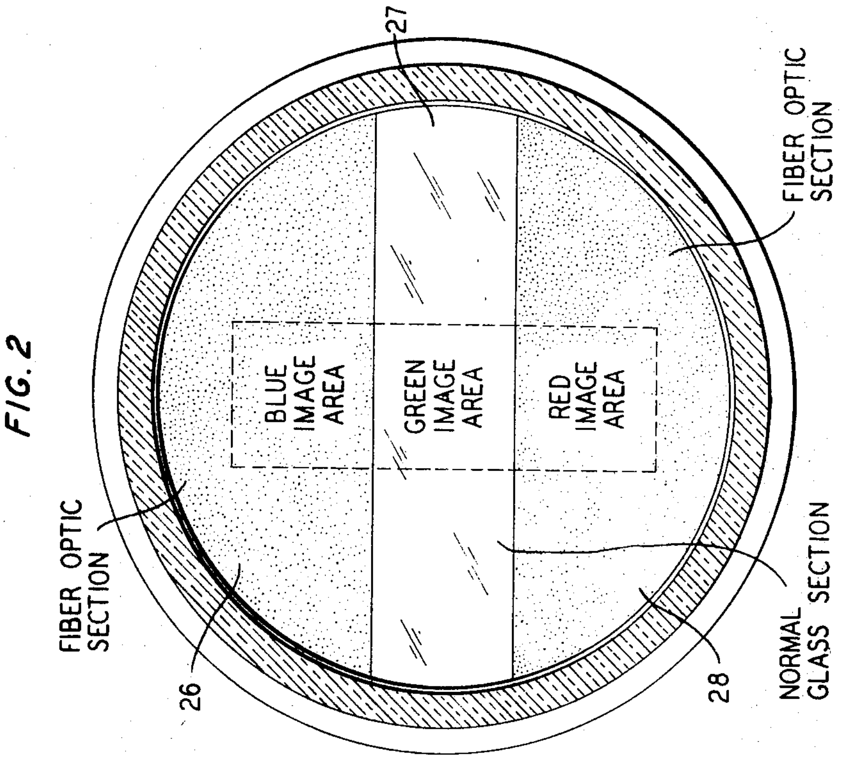
FIG. 2 is a view taken on the line 2—2 of FIG. 1.

The normal glass section 27, cemented or fused between the fiber optic sections 26 and 28, lies in the path of the unreflected light, i.e., green. The glass section 27 provides a path-lengthening function and hence its thickness (i.e., the dimension in the direction of light travel), should be such as to achieve path length equalization of all three paths. That is, this thickness must equal the difference in path length between that of the reflected light and that of the unreflected light. The thicknenss of the fiber optic sections is immaterial, since no path lengthening is involved, and, therefore, the faceplate can be of uniform thickness. Thus, three separate, closely spaced, color-distinct images are presented at the photoconductive surface 29 of the camera tube with the images in line, as shown in FIG. 2, all in focus in the same plane. The images are each of approximately 0.220" dimension.

With the exception of the faceplate, the camera tube can be similar to the vidicon tubes used in visual telephone sets, but, of course, the invention is in no way limited thereto. Instead of the typical photoconductive surface used in the conventional vidicon tube, a matrix of silicon diodes can be utilized as the photo-active surface; see, for example, the patent application of T. M. Buck-M. H. Crowell-E. I. Gordon, Ser. No. 605,715, filed Dec. 29, 1966. The active surface of the vidicon, photoconductive or silicon diodes as the case may be, is scanned sequentially to generate the requisite video television signals for transmission to a remote location.

The multiple image/single pickup tube color television camera system described would be of particular utility in a color video telephone station set, where the impracticability of more than one pickup tube is obvious.

While for the purpose of illustrating and describing the present invention a particular embodiment has been shown and described, it is to be understood that this embodiment is capable of such modifications as may be commensurate with the spirit and scope of the invention set forth in the following claims.

What is claimed is:

1. In a single pickup tube color television camera system, a right angle prism positioned in the path of incident radiant energy with the diagonal surfaces thereof disposed to deflect selected portions of the incident energy at right angles to the path of light travel, a pair of selected dichroic layers respectively contiguous with said diagonal surfaces and serving to reflect distinct color components of the visible spectrum, a second pair of dichroic surface layers disposed parallel to the first-mentioned pair and having respective reflectivities which complement that of the first pair, the complementary dichroic surface being separated by polygonal prisms which are bonded to said right angle prism with additional prisms bonded thereto to form an integral prism assembly having plane parallel entrance and exit faces normal to the several light paths with the reflected light paths being equal in length, and a composite camera tube faceplate secured in abutment against the plane exit face of the prism assembly, said faceplate composed of two sections of fiber optic material separated by an intermediate section of material similar to that of the prisms, said fiber optic sections serving to respectively transfer the reflected light images to the rear surface of the faceplate and said intermediate section serving to lengthen the path of the unreflected light so as to equal that of the reflected light.

2. A color camera system as defined in claim 1 wherein the prisms and the intermediate section of said faceplate are made of the same type optical glass.

3. A color camera system as defined in claim 2 wherein said prism assembly presents a planar exit face and said faceplate in abutment therewith is of uniform cross-section, whereby all possible intervening air/glass boundaries between the entrance and exit faces of the optical system are eliminated.

4. A color camera system as defined in claim 3 wherein prism means are selectively cemented to the integral prism assembly to eliminate the air-to-glass boundaries at said second pair of dichroic surfaces.

5. A color camera system as defined in claim 4 wherein the first pair of dichroic surfaces serve to respectively reflect blue and red light rays, while passing green light rays.

6. A color camera system as defined in claim 5 wherein the blue dichroic surface precedes the red in the path of the incoming radiant energy.

7. A color camera system as defined in claim 6 wherein said fiber optic material is of the same index of refraction as said prism glass.

References Cited

UNITED STATES PATENTS

| | | | |
|---|---|---|---|
| 2,552,464 | 5/1951 | Siezen. | |
| 3,060,789 | 10/1962 | Hicks. | |
| 3,202,039 | 8/1965 | De Lange et al. ------ | 350—173 |

RICHARD MURRAY, Primary Examiner

R. P. LANGE, Assistant Examiner

U.S. Cl. X.R.

178—6, 72; 313—110, 111; 350—96